United States Patent
Kanzaka et al.

(10) Patent No.: US 6,748,969 B2
(45) Date of Patent: Jun. 15, 2004

(54) POPPET VALVE WITH HEATER

(75) Inventors: Ikuo Kanzaka, Tsukuba-gun (JP); Toyonobu Sakurai, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/277,832

(22) Filed: Oct. 23, 2002

(65) Prior Publication Data

US 2003/0098066 A1 May 29, 2003

(30) Foreign Application Priority Data

Nov. 26, 2001 (JP) ........................... 2001-359659

(51) Int. Cl.[7] ............................................... F16K 49/00
(52) U.S. Cl. ...................... 137/341; 137/338; 251/63.5; 251/335.3
(58) Field of Search ................................. 137/341, 338; 251/335.3, 63.5

(56) References Cited

U.S. PATENT DOCUMENTS

| | | | |
|---|---|---|---|
| 3,110,319 A | * 11/1963 | Arata et al. | 137/341 |
| 5,678,595 A | * 10/1997 | Iwabuchi | 137/341 |
| 5,755,255 A | * 5/1998 | Iwabuchi | 137/341 |
| 5,915,410 A | * 6/1999 | Zajac | 137/341 |
| 6,321,780 B1 | * 11/2001 | Iwabuchi | 137/341 |

FOREIGN PATENT DOCUMENTS

| | | |
|---|---|---|
| JP | 11-82807 | 3/1999 |
| JP | 3005449 | 11/1999 |
| JP | 3012831 | 12/1999 |

* cited by examiner

*Primary Examiner*—A. Michael Chambers
(74) *Attorney, Agent, or Firm*—Oblon, Spivak, McClelland, Maier & Neustadt, P.C.

(57) ABSTRACT

To constitute a poppet valve with a heater by providing a heater which heats a valve member at a fixed position inside valve casing without attaching the heater to the valve member, a rod or the like which is a movable member as necessary. In a valve casing 1 having main ports 11, 12, a flow path 13 which connects these main ports 11, 12, a valve seat 14 which is provided inside the flow path 13, a valve member 17 which opens/closes the valve seat 14, and a rod 18 which is coupled to the valve member 17, a cylindrical heat transfer body 28 is disposed at a fixed position therein so as to surround the rod 18, and the heat transfer body 28 is caused to house a first heater 31 therein, so that a poppet valve is constituted such that the valve member 17 comes in contact with the heat transfer body 28 at a time of opening of the valve member 17.

9 Claims, 1 Drawing Sheet

[Fig. 1]
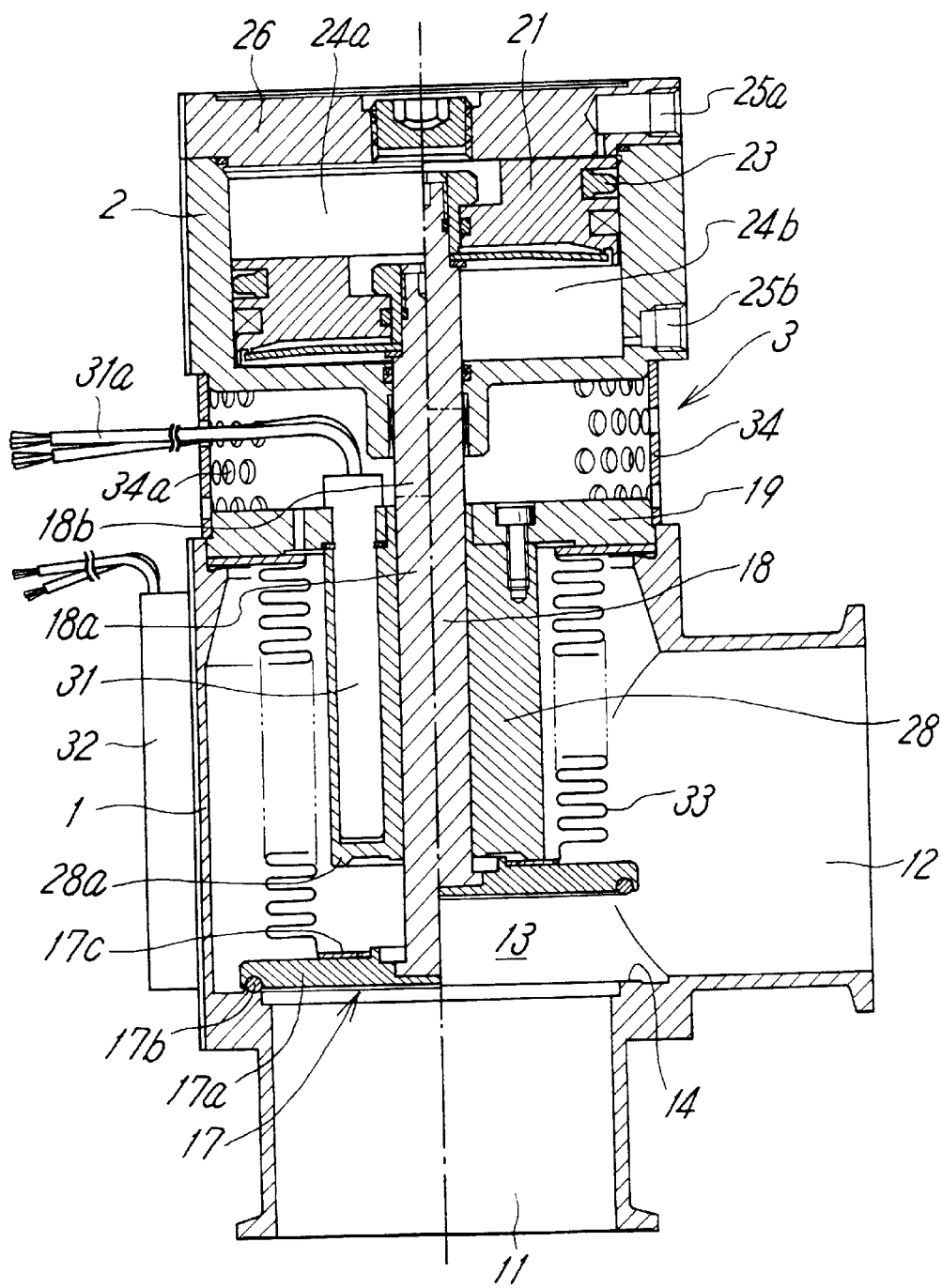

POPPET VALVE WITH HEATER

TECHNICAL FIELD TO WHICH THE INVENTION BELONGS

The present invention relates to a poppet valve which is directly used for supplying working fluid such as reaction gas or the like in physical and/or chemical machines or the like or which is used for pressure reduction of a vacuum chamber using such reaction gas or the like. More specifically, the present invention relates to a poppet valve with a heater that is constituted so as to prevent product from the working fluid from adhering to a valve member or the like by a heater.

PRIOR ART

In a manufacturing apparatus for semiconductors, for example, reaction gas with a high temperature is used for such a chemical processing as an etching which is transferred in a vacuum chamber, and a poppet valve is used for supplying the reaction gas or reducing pressure in the vacuum chamber. However, when the temperature of the reaction gas is lowered, the product is easy to deposit and the product adheres to respective members such as a valve member, a bellows and the like included in the poppet valve to lower an opening/closing accuracy of the valve. Therefore, in such a poppet valve, it is important that such a constitution is employed that deposition of product from the working fluid or adhesion thereof to the valve member and the like can be prevented.

For this reason, poppet valves with a heater which heats the interior of a casing, a valve member and the like by a heater to prevent adhesion of product have conventionally been proposed. In Japanese Patent No. 3005449 publication, there has been disclosed one where a band heater is wound on an outer face of a casing and a rod-shape heater is attached to a valve member for opening/closing a flow path through the interior of a hollow rod extending from the valve member. Also, in Japanese Patent No. 3012831, there has been disclosed one where a rubber heater is attached to an outer face of a casing and anther heater is attached an outer periphery of a cylindrical holding body integral with a valve member. Further, in JP-A 11-82807 publication, there has been disclosed one where a rubber heater is attached to an outer face of a casing and a flexible heater is housed in the interior of a hollow rod integral with a valve member.

However, in each of such conventional poppet valves, since a heater for heating a valve member is attached to the valve member or the rod which is a movable member, there is a problem that the weight of the entire movable member including the valve member or the rod is increased due to attachment of the heater so that a driving force required for opening/closing the valve must not only be increased correspondingly but also a response performance is deteriorated. In addition, since an impact generated for each of opening/closing operations of the valve member is directly transmitted to the heater, there is a drawback that the heater disconnects or breaks easily due to the impact. Also, since the valve member is always heated by the heater even when it is unnecessary to heat the valve member so strongly in a state where a large amount of working fluid is not flowing in the interior of the valve, there is a problem that a heat efficiency is poor and thermal deterioration of a rubber-made sealing member which is weak in heat occurs easily.

DISCLOSURE OF THE INVENTION

A technical object of the present invention is to provide a poppet valve with a heater which has an efficient and reasonable design structure and which has solved the above described conventional problems by employing such a constitution that a heater for heating a valve member is provided at a fixed position inside a valve casing without attaching the heater to the valve member, a rod or the like which is a movable member, thereby allowing transfer of much heat to the valve member as necessary.

According to the present invention for solving the above problem, there is provided a poppet valve with a heater, comprising: a valve casing which has a first main port and a second main port, a flow path connecting both the main ports to each other, and a valve seat provided inside the flow path; a cylinder which is coupled to the valve casing via a heat insulating portion; a valve member of a poppet type which is provided inside the valve casing to open/close the valve seat; a rod whose distal end portion is coupled to the valve member and whose proximal end portion extends into the interior of the cylinder via the heat insulating portion; a piston which is slidably disposed in the interior of the cylinder via a sealing member and is coupled to the proximal end of the rod; a heat transfer body which is disposed at a fixed position inside the valve casing along the rod and whose distal end portion is provided with a heat transfer face coming in contact with the valve member at a position of valve opening; first heater which is attached to the heat transfer body; and a second heater which is attached on an outer face of the valve casing.

According to the poppet valve of the present invention having the above constitution, since such a constitution is employed that the heat transfer body is provided at a fixed position inside the valve casing and the first heater for heating a valve member is attached to the heat transfer body so that the valve member comes in contact with the heat transfer body to be heated at a time of opening of the valve member, there does not occur such a problem that a driving force at a time of opening/closing is increased due to increase in weight of the valve member or a response performance is deteriorated like the case that the heater has been directly attached to the valve member or the rod. In addition, since such a system is employed that the valve member comes in contact with the heat transfer body to be directly heated at a time of valve opening when working fluid flows in the interior of the valve, an energy efficiency is high and the sealing member deterioration of the sealing member occurring in such a case that a direct heating is performed is hard to occur. Further, since an impact generated according to opening/closing of the valve member is not transferred to the heater, the problem of injury of the heater does not occur.

According to a specific embodiment of the present invention, the heat transfer body takes a cylindrical shape and it is disposed so as to surround the rod, and the heater is housed in the interior of the heat transfer body.

Also, the heat insulating portion is formed of a cylindrical heat insulating plate having a plurality of vent holes, and the heat insulating plate is provided between the valve casing and the cylinder concentrically with the rod.

According to a preferred embodiment of the present invention, the rod is partitioned to a first portion positioned on the side of the valve member and a second portion positioned on the side of the piston, and the second portion is formed of material having a heat transfer property lower than that of material of the first portion.

According to a specific embodiment of the present invention, a bellows is provided between a partition wall of an end portion of the valve casing and the valve member, and the heat transfer body is accommodated in the interior of the bellows and a heat receiving face coming in contact with a heat transfer face of the heat transfer body is formed at a portion of a back face of the valve member which is included in the bellows.

BRIEF DESCRIPTION OF THE INVENTION

FIG. 1 is a sectional view showing one embodiment of a poppet valve according to the present invention.

DETAILED DESCRIPTION

FIG. 1 shows an embodiment of a poppet valve with a heater according to the present invention. This poppet valve is suitable for use for pressure reduction in a vacuum chamber in a semiconductor manufacturing apparatus, and it is provided with a cylindrical valve casing 1, and a cylinder 2 coupled to an end portion of the valve casing 1 in an axial direction thereof via a heat insulating portion 3.

In the valve casing 1, a first main port 11 for connection to one of the vacuum chamber and a vacuum pump and a second main port 12 for connection to the other thereof are provided in directions different from each other by 90°, and a flow path 13 connecting both the main ports 11, 12 to each other and a valve seat 14 provided inside the flow path 13 are provided.

A valve member 17 of a poppet type which opens/closes the valve seat 14 is provided in the interior of the valve casing 1. This valve member 17 is constituted by attaching a rubber-made sealing member 17b approaching to/separating from the valve seat 14 to a lower face outer periphery of a disc-shaped base member 17a, and a distal end portion of a rod 18 for driving is attached to a central portion of a back face of the valve member 17. A proximal end portion of the rod 18 penetrates a partition wall 19 of an end portion of the valve casing 1 and the heat insulating portion 3 to extend in the interior of the cylinder 2 and be coupled to a piston 21. The piston 21 is slidably disposed in the interior of the cylinder 2 via a sealing member 23, and a first pressure chamber 24a and a second pressure chamber 24b are formed on both sides of the piston 21. These pressure chambers 24a, 24b are respectively connected to a first operation port 25a and a second operation port 25b which are opened at a side face of the cylinder 2. In the figure, reference numeral 26 denotes a cover which closes an end portion of the cylinder 2.

A heat transfer body 28 is arranged in the interior of the valve casing 1 along the rod 18. The heat transfer body 28 is one which is formed in a cylindrical shape from metal material excellent in heat transfer property such as aluminum and is disposed concentrically with the rod 18 while a small gap is maintained about the rod 18. The heat transfer body is fixedly arranged at a fixed position inside the valve casing 1 by fixing its proximal end portion to the partition wall 19 by a bolt. One or plural rod-shaped first heaters 31 of an electric resistance heat generating type are housed in the thickness of the heat transfer body 28 in parallel with the rod 18. Also, a distal end portion of the heat transfer body 28 is formed as an annular heat transfer face 28a. The heat transfer face 28a is spaced from the valve member 17 advanced up to a position of valve closing each other by a fixed distance so that they do not come in contact with each other, but the heat transfer face 28a comes in contact with an annular heat receiving face 17c of a back face of the valve member 17 when the valve member 17 retracts according to a valve opening.

An extensible bellows 33 is attached between the partition wall 19 of the valve casing 1 and the valve member 17, and the heat transfer body 28 is accommodated in the interior of the bellows 33 and the heat receiving face 17c at the back face of the valve member 17 is included therein.

The heat insulating portion 3 is formed of a cylindrical heat insulating plate 34 having a plurality of vent holes 34a, the heat insulating plate 34 is disposed between the valve casing 1 and the cylinder 2 so as to surround the rod 18 concentrically with the rod, and the rod 18 is cooled by air flowing in the interior of the heat insulating plate 34. Also, lead wires 31a of the first heater 31 are derived from some vent holes 34a of the heat insulating plate 34 or lead-through holes provided specially to the outside.

Also, a second heater 32 which heats the interior of the valve casing from the outside is provided on an outer surface of the valve casing 1. This second heater 32 may be a rod-shaped heater like the first heater 31, but a sheet-like flexible heater may be used as the second heater. This sheet-like heater is one where an electric resistance heat generating body is housed in an outer skin made of silicon rubber or the like, and the structure itself of such a sheet-like heater has been already known.

In the poppet valve having the above-described constitution, when pressure fluid is supplied from the first operation port 25a into the first pressure chamber 24a, as shown on a left half portion in FIG. 1, the piston 21 and the rod 18 are advanced so that the valve member 17 at the distal end of the rod 18 is also advanced to abut on the valve seat 14 and the valve seat 14 is closed. At this time, the valve member 17 is spaced from the heat transfer body 28 by a fixed distance, and heat from the first heater 31 is not directly transferred to the heat receiving 17c via the heat transfer body 28 so that the valve member 17 is put in a state where it is indirectly heated by the first heater 31 and the second heater 32. Thus, in the state where the valve member 17 has closed the valve seat 14, since working fluid such as reaction gas or the like is not flowed into the poppet valve in a large amount, and therefore the valve member 17 does not also be brought in contact with the large amount of the working fluid, the amount of heat required for heating the poppet valve, particularly, heating the valve member 17 may be little. As described above, adhesion of reaction product can securely be prevented even by only indirect heating transferred by the first heater 31 and the second heater 32.

Next, when the first operation port 25a is opened and pressure fluid is supplied from the second operation port 25b into the second pressure chamber 24b, as shown on a right half portion in FIG. 1, the piston 21 and the rod 18 retracts so that the valve member 17 opens the valve seat 14 and the heat receiving face 17c of the valve member 17 abuts on the heat transfer face 28a positioned at the distal end of the heat transfer body 28. Thereby, heat from the first heater 31 is directly transferred to the valve member 17 from the heat transfer body 28 and the valve member 17 is heated. For this reason, the amount of heat transferred to the valve member 17 is increased, and even when the valve member 17 comes in contact with a large amount of working fluid, the working fluid is cooled so that product can securely be prevented from adhering to the valve member 17.

On the other hand, a small gap for allowing a relative displacement between the heat transfer body 28 and the rod 18 is interposed therebetween. In case that more heat from the first heater 31 is required to be transferred to the valve member 17 from this heat transfer body 28 via the rod 18, such constitution can be employed that the gap is made as small as possible and simultaneously the rod 18 is formed of material which is excellent in heat transfer property such as aluminum. On the contrary, in order to make it hard for heat from the first heater 31 to conduct to the rod 18 via the heat transfer body 28, the gap can be made as large as possible, the rod 18 can be formed of material having a large heat transfer resistance, such as ceramics or the like, or both of these can be implemented.

Incidentally, heat which has transferred from the first heater 31 to the rod 18 via the heat transfer body 28 conducts from this rod 18 to the piston 21 side but most thereof is isolated due to heat radiation transferred at the heat insulating portion 3 so that the heat is hardly transferred to the piston 21. Therefore, there is not a possibility that the sealing member 23 is deteriorated. However, as means for more securely preventing heat of the rod 18 from transfer to the piston 21, such a constitution can be employed that the rod 18 is partitioned into a first portion 18a positioned on the valve member 17 side and a second portion 18b positioned on the piston 21 side regarding a position indicated by a dotted line in the figure and the second portion 18b is formed of material having a large heat transfer resistance. Incidentally, the coupling of the first portion 18a and the second portion 18b can be carried out by a suitable process such as a screwing process, a pressure-fitting process or the like.

According to the poppet valve thus obtained, since such a constitution has been employed that the heat transfer body 28 is provided at the fixed position inside the valve casing 1, the first heater 31 is attached to the heat transfer body 28, and the valve member 17 is brought into contact with the heat transfer body 28 to be heated at a time of opening the valve member 17, there does not occur such a problem that a driving force at the time of opening/closing the valve is made large due to increase in weight of the valve member 17, the response performance is deteriorated and so on, such that the heater 31 has been directly attached to the valve member 17 or the rod 18. In addition, only when the valve member 17 has been opened and working fluid is flowing inside the valve, such a state is obtained that the valve member 17 comes in contact with the heat transfer body 28 and heat from the first heater 31 is directly transferred to the valve member via this heat transfer body, so that the energy efficiency is excellent and deterioration of the sealing member occurring when the direct heating is always performed hardly occurs. Further, since an impact according to opening/closing the valve member 17 is not transmitted to the heater, the problem of damage of the heater is solved.

Thus, according to the present invention, since a heater for heating a valve member is provided at a fixed position inside a valve casing via a heat transfer body without attaching the heater to a valve member, a rod or the like which is a movable member, and heat is directly transferred to the valve member via this heat transfer body as necessary, the problem specific to a conventional article where a heater has been attached to a valve member, a rod or the like is solved so that a poppet valve with a heater having an efficient and reasonable design structure can be obtained.

What is claimed is:

1. A poppet valve with a heater, comprising:
    a valve casing which has a first main port and a second main port, a flow path connecting both the main ports to each other, and a valve seat provided inside the flow path;
    a cylinder which is coupled to the valve casing via a heat insulating portion;
    a valve member of a poppet type that is provided inside the valve casing to open/close the valve seat;
    a rod whose distal end portion is coupled to the valve member and whose proximal end portion extends into the interior of the cylinder via the heat insulating portion;
    a piston which is slidably disposed in the interior of the cylinder via a sealing member and is coupled to the proximal end of the rod;
    a heat transfer body which is disposed at a fixed position inside the valve casing along the rod and whose distal end portion is provided with a heat transfer face coming in contact with the valve member at a position of valve opening;
    a first heater which is attached to the heat transfer body; and
    a second heater which is attached on an outer face of the valve casing.

2. A poppet valve according to claim 1, wherein the heat transfer body is made cylindrical and is disposed about the rod concentrically therewith, and the heater is housed in the interior of the heat transfer body.

3. A poppet valve according to claim 1, wherein the heat insulating portion is formed of a cylindrical heat insulating plate having a plurality of vent holes, and the heat insulating plate is provided between the valve casing and the cylinder so as to surround the rod.

4. A poppet valve according to claim 1, wherein the rod is partitioned to a first portion positioned on the side of the valve member and a second portion positioned on the side of the piston, and the second portion is formed of material having a heat transfer property lower than that of the first portion.

5. A poppet valve according to claim 1, wherein a bellows is provided between a partition wall of an end portion of the valve casing and the valve member, the heat transfer body is accommodated in the interior of the bellows, and a heat receiving face coming in contact with the heat transfer face of the heat transfer body is formed on a portion of a back face of the valve member which is included in the bellows.

6. A poppet valve with a heater, comprising:
    a valve casing which has a first main port and a second main port, a flow path connecting both the main ports to each other, and a valve seat provided inside the flow path;
    a cylinder which is coupled to the valve casing via a heat insulating portion;
    a valve member of a poppet type which is provided inside the valve casing to open/close the valve seat;
    a rod whose distal end portion is coupled to the valve member and whose proximal end portion extends into the interior of the cylinder via the heat insulating portion;
    a piston which is slidably disposed in the interior of the cylinder via a sealing member and is coupled to the proximal end of the rod;
    a cylindrical heat transfer body which is disposed at a fixed position inside the valve casing so as to surround the rod concentrically with the rod and which is provided at its distal end portion with a heat transfer face coming in contact with the valve member at a time of valve opening;
    one or more first heaters which are housed in the heat transfer body;
    one or more second heaters which are attached to an outer surface of the valve casing; and
    an extensible bellows which is disposed in the interior of the valve casing in a state that one end thereof is fixed to a partition wall of an end portion of the valve casing and the other end thereof is fixed to the valve member, and which surrounds the heat transfer body.

7. A poppet valve according to claim 6, wherein the heat insulating portion is formed of a cylindrical heat insulating plate having a plurality of vent holes, and the heat insulating plate is provided between the valve casing and the cylinder so as to surround the rod.

8. A poppet valve according to claim 6, wherein the rod is partitioned to a first portion positioned on the side of the valve member and a second portion positioned on the side of the piston, and the second portion is formed of material having a heat transfer property lower than that of the first portion.

9. A poppet valve with a heater, comprising:
- a valve casing which has a first main port and a second main port, a flow path connecting both the main ports to each other, and a valve seat provided inside the flow path;
- a cylinder which is coupled to the valve casing via a heat insulating portion;
- a valve member of a poppet type that is provided inside the valve casing to open/close the valve seat;
- a rod whose distal end portion is coupled to the valve member and whose proximal end portion extends into the interior of the cylinder via the heat insulating portion;
- a piston which is slidably disposed in the interior of the cylinder via a sealing member and is coupled to the proximal end of the rod;
- a heat transfer body which is disposed at a fixed position inside the valve casing along the rod and whose distal end portion is provided with a heat transfer face coming in contact with the valve member at a position of valve opening;
- a first heater which is attached to the heat transfer body; and
- a second heater which is attached on an outer face of the valve casing, wherein
- a valve member comes in contact with a heat transfer face when a valve seal is opened, and the valve member is not in contact with the heat transfer face when the valve seat is closed.

* * * * *